United States Patent [19]

Van Veen et al.

[11] Patent Number: 5,292,778

[45] Date of Patent: Mar. 8, 1994

[54] POLYMER-MODIFIED POLYOL DISPERSIONS AND PROCESSES FOR PRODUCTION AND USE THEREOF

[75] Inventors: Kasper J. Van Veen; G. Ronald Blair, both of Richmond Hill, Canada

[73] Assignee: Woodbridge Foam Corporation, Mississauga, Canada

[21] Appl. No.: 980,204

[22] Filed: Nov. 20, 1992

[51] Int. Cl.⁵ .............................................. C08G 18/14
[52] U.S. Cl. ................................. 521/126; 521/127; 521/164; 521/167; 524/724; 524/728; 528/75; 528/78; 528/85
[58] Field of Search ............... 521/126, 127, 164, 167; 524/724, 728; 528/75, 78, 85

[56] References Cited

U.S. PATENT DOCUMENTS

| 4,184,990 | 1/1980 | Reischl et al. | 260/29.2 TN |
|---|---|---|---|
| 4,293,470 | 10/1981 | Cuscurida | 260/45.9 R |
| 4,293,679 | 10/1981 | Cogliano et al. | 528/48 |
| 4,305,857 | 12/1981 | Reischl | 260/29.2 TN |
| 4,305,858 | 12/1981 | Reischl | 260/29.2 TN |
| 4,374,209 | 2/1983 | Rowlands | 521/116 |
| 4,431,754 | 2/1984 | Hoffman | 521/137 |
| 4,438,252 | 3/1984 | Carroll et al. | 528/75 |
| 4,452,923 | 6/1984 | Carroll et al. | 521/167 |
| 4,506,040 | 3/1985 | Raes et al. | 521/137 |
| 4,521,581 | 6/1985 | Dominguez et al. | 528/57 |
| 4,659,772 | 4/1987 | Hoy et al. | 524/775 |
| 4,745,153 | 5/1988 | Hoffman | 524/762 |
| 5,068,280 | 11/1991 | Pal et al. | 524/728 |

FOREIGN PATENT DOCUMENTS 2163762 3/1986 United Kingdom .

OTHER PUBLICATIONS

Picken, K. "PIPA-Process for the Future", Urethanes Technology, Jun. 1984, pp. 23-24.

*Primary Examiner*—Maurice J. Welsh
*Attorney, Agent, or Firm*—Fitzpatrick, Cella, Harper & Scinto

[57] ABSTRACT

A polymer-modified polyol dispersion comprises a polyaddition product dispersed in a polyol. The polyaddition product is present in an amount of from about 25 to about 70 percent by weight based on the total weight of the polyaddition product and the polyol. The dispersion has a viscosity in the range of from about 4,000 to about 50,000 mPa.s, the viscosity remaining substantially the same after production of the dispersion. A process for producing the polymer-modified polyol dispersion is also disclosed together with a process for using the dispersion to produce a polyurethane foam.

39 Claims, 3 Drawing Sheets

POLYMER-MODIFIED POLYOL DISPERSIONS AND PROCESSES FOR PRODUCTION AND USE THEREOF

BACKGROUND OF THE INVENTION

1. Field of the Invention

The present invention relates to polymer-modified polyol dispersions and to processes for production thereof, and use thereof to produce polyurethane foams. More particularly, the present invention relates to polymer-modified polyol dispersions having a combination of high solids content and improved stability.

2. Description of the Prior Art

Polymer-modified polyol dispersions are known and, in the context of dispersions used to make polyurethane foam, are often referred to as PIPA (PolyIsocyanate PolyAddition) polyols. These terms will be used interchangeably throughout this specification.

A useful background discussion on PIPA polyols may be found in "PIPA-Process For The Future"; Picken, K., *Urethanes Technology*, June 1984, pg. 23-24, the contents of which are incorporated herein by reference. PIPA polyol is a dispersion in which the polyol acts as a substantially inert carrier for PIPA particles. The PIPA particles are formed by the reaction of an isocyanate and a trifunctional alkanolamine, optionally in the presence of an organotin catalyst. The reaction product is an array of alkanolamine and isocyanate groups having pendant hydroxyl groups for further reaction.

One of the earliest patents relating to the production of PIPA polyols is U.S. Pat. No. 4,374,209 (Rowlands), the contents of which are incorporated herein by reference. Rowlands discloses the production of PIPA polyols by polymerizing an olamine with an organic polyisocyanate in the presence of a polyol. The olamine is described as an organic compound having one or more hydroxyl groups and also one or more amine groups. The olamine reacts at least predominantly polyfunctionally with the isocyanate. The polyol functions as a substantially inert carrier for the PIPA product. Rowlands purports to be able to produce a PIPA polyol having a solids content of from 1% to 35% by weight based on the weight of the polyol. It is noteworthy that Rowlands exemplifies PIPA polyols having a solids content of up to 20% by weight with the product at upper limit described as having "an acceptable viscosity".

U.S. Pat. No. 4,293,470 (Cuscurida), the contents of which are incorporated herein by reference, discloses a polyurea polyol with purportedly improved storage stability. Specifically, the subject polyurea polyol is produced by reacting a hydroxyl-containing amine, a polyether polyol and an organic polyisocyanate. The reaction product is then quenched with a secondary amine. In the Examples provided in Cuscurida, quenching of the reaction product was effected two to three hours after initiation of the reaction. U.S. Pat. No. 4,452,923 (Carroll et al.), the contents of which are incorporated herein by reference, discloses polymer-modified polyols. Specifically, there is disclosed a high strength polymer-modified polyol comprising a polyol and from about 40% to about 80% by weight of the reaction product of a polyisocyanate and a tertiary-N-polyolanine, based on the combined weight of the polyol and the reaction product. The tertiary-N-polyol is described as an organic compound having two or more hydroxyl groups and one or more tertiary amine groups. The use of a catalyst in the reaction is optional. It is apparent from the Examples that the proportion of the polyisocyanate and polyolamine in the reaction is important for achieving the purported advantages of the invention. Specifically, it is disclosed that the reaction is conducted such that the ratio of isocyanate groups to hydroxyl groups provided by the polyolamine is from 0.33:1 to 1:1. Indeed, Example 1 illustrates the importance of observing this ratio to avoid production of a low strength polyol (solids content of 10% by weight). It is also noteworthy that, beyond providing an indication of solids content, the high strength polyol is not isolated for complete analysis nor is there any indication provided of its viscosity. Indeed, one of the deficiencies of Carroll et al, is that the high strength polymer-modified polyol must be diluted immediately after production to prevent gelling thereof.

Heretofore, prior art PIPA polyols have suffered from being relatively unstable, notwithstanding the fact that much of this prior art purports to provide a polyol having a relatively high solids content (e.g. 25% or higher). The problem stems from the fact that it is very difficult to produce such a high solids content polyol which does not have to be diluted immediately after production to prevent gelling thereof. Indeed, to the inventors' knowledge, there is currently no commercially available polymer-modified polyol having a high solids content (e.g. greater than 20% by weight solids).

In light of the foregoing it would be desirable to have a polymer-modified polyol dispersion having a high solids content, a viscosity substantially below the gelling point and post-production stability as a function of little or no increase in the viscosity of the polyol dispersion. Numerous advantages would accrue from the provision of such a polymer-modified polyol dispersion. The major advantage would be that the high solids polymer-modified polyol dispersion could be produced in one site and safely shipped to the user at another site without dilution. This would result in an enormous savings in shipping costs since a larger volume of solids could be shipped at one time.

SUMMARY OF THE INVENTION

It is an object of the present invention to provide a novel polymer-modified polyol dispersion which obviates or mitigates at least one of the foregoing deficiencies of the prior art.

It is another object of the present invention to provide a novel process for producing a polymer-modified polyol dispersion.

It is yet another object of the present invention to provide a novel process for producing polyurethane foam.

Accordingly, in one of its aspects, the present invention provides a polymer-modified polyol dispersion comprising a polyaddition product dispersed in a polyol, the polyaddition product being present in an amount of from about 25 to about 70 percent by weight based on the total weight of the polyaddition product and the polyol, the dispersion having a viscosity in the range of from about 4,000 to about 50,000 mPa.s, the viscosity remaining substantially the same after production of the polymer-modified polyol dispersion.

In another of its aspects, the present invention provides a process for producing a polymer-modified polyol dispersion comprising the steps of:

(i) reacting an isocyanate and a first olamine in the presence of a substantially inert polyol to produce a reaction mixture; and (ii) adding a second olamine which may be the same as or different from the first olamine to the reaction mixture prior to completion of the reaction between the isocyanate and the first olamine to produce the polymer-modified polyol dispersion.

In another of its aspects, the present invention provides a process for producing a polyurethane comprising the step of reacting a polymer-modified polyol dispersion, a catalyst and an isocyanate;

wherein the polymer-modified polyol dispersion comprises a polyaddition product dispersed in a polyol, the polyaddition product being present in an amount of from about 25 to about 70 percent by weight based on the total weight of the polyaddition product and the polyol, the dispersion having a viscosity in the range of from about 4,000 to about 50,000 mPa.s, the viscosity remaining substantially the same after production of the polymer-modified polyol dispersion.

Although not wishing to be bound by any theory or mode of action, it is believed that post-production gelling and the consequent dramatic increase in viscosity of prior art polymer-modified polyols is the result of excessive crosslinking between the polymer particles (PIPA) and the polyol carrier. As the reaction between the isocyanate and the olamine in the polyol medium concludes, the viscosity of the reaction mixture increases. The increase in viscosity is greater than that which would be expected from the simple addition of solids into a medium and is attributable to a limited amount of crosslinking which occurs between the PIPA particles and the polyol carrier.

This crosslinking is believed to be the result of competitive reactions between (i) the isocyanate and the olamine, and (ii) the isocyanate and the polyol carrier (i.e. to produce a polyurethane). More of reaction (ii) can be considered as an increase in the amount of crosslinking resulting in an increase in the viscosity of the mixture which, at high solids content levels, leads to gelling of the mixture. Excessive crosslinking can occur as a result of one or more of the following:

1. Use of a too highly reactive polyol (e.g. polyols with a primary hydroxyl content of greater than 90%).
2. Use of large amounts of isocyanate (e.g. isocyanate to olamine ratio of 1:1).
3. Use of a formulation chosen to produce a high solids content dispersion (e.g. greater than 20% solids).

Thus, in order to achieve a high solids content, low viscosity PIPA polyol dispersion, the reaction between the isocyanate and the polyol (i.e. reaction (ii)) must be limited to some degree. It is important to note that reaction (ii) should not be completely eliminated since this will result in an unstable dispersion. If indeed reaction (ii) is eliminated, the solids are not part of the polyol matrix at all, the particles are then only temporarily suspended in the polyol medium and therefore would settle over time.

The present inventors have discovered that, in a mixture comprising an isocyanate, an olamine and a polyol, reaction between the isocyanate and the olamine occurs initially and preferentially. During this period, as the active sites on the olamine become consumed, the reaction subsides significantly to the point where it ceases due to the remaining active site on the olamine being sterically hindered from further reaction with the isocyanate. At this point, reaction between the isocyanate and the polyol becomes preferred and the result is that the viscosity of the mixture begins to increase dramatically.

The present inventors have further discovered that subsequent, discrete addition of a second olamine (the same as or different from the olamine originally used) prior to completion of the reaction between the isocyanate and the original olamine allows unreacted isocyanate to form PIPA particles preferentially over reaction with the polyol carrier. In other words, provision of the second olamine in accordance with the present invention will result in use of the isocyanate in the formation of PIPA particles and effective blocking of polyol interaction. This allows control over the viscosity of the resultant PIPA dispersion. Indeed, the polymer-modified polyol dispersion of the present invention exhibits surprising and unexpected stability (i.e. little or no increase in viscosity over time) which, heretofore, has not been achieved.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
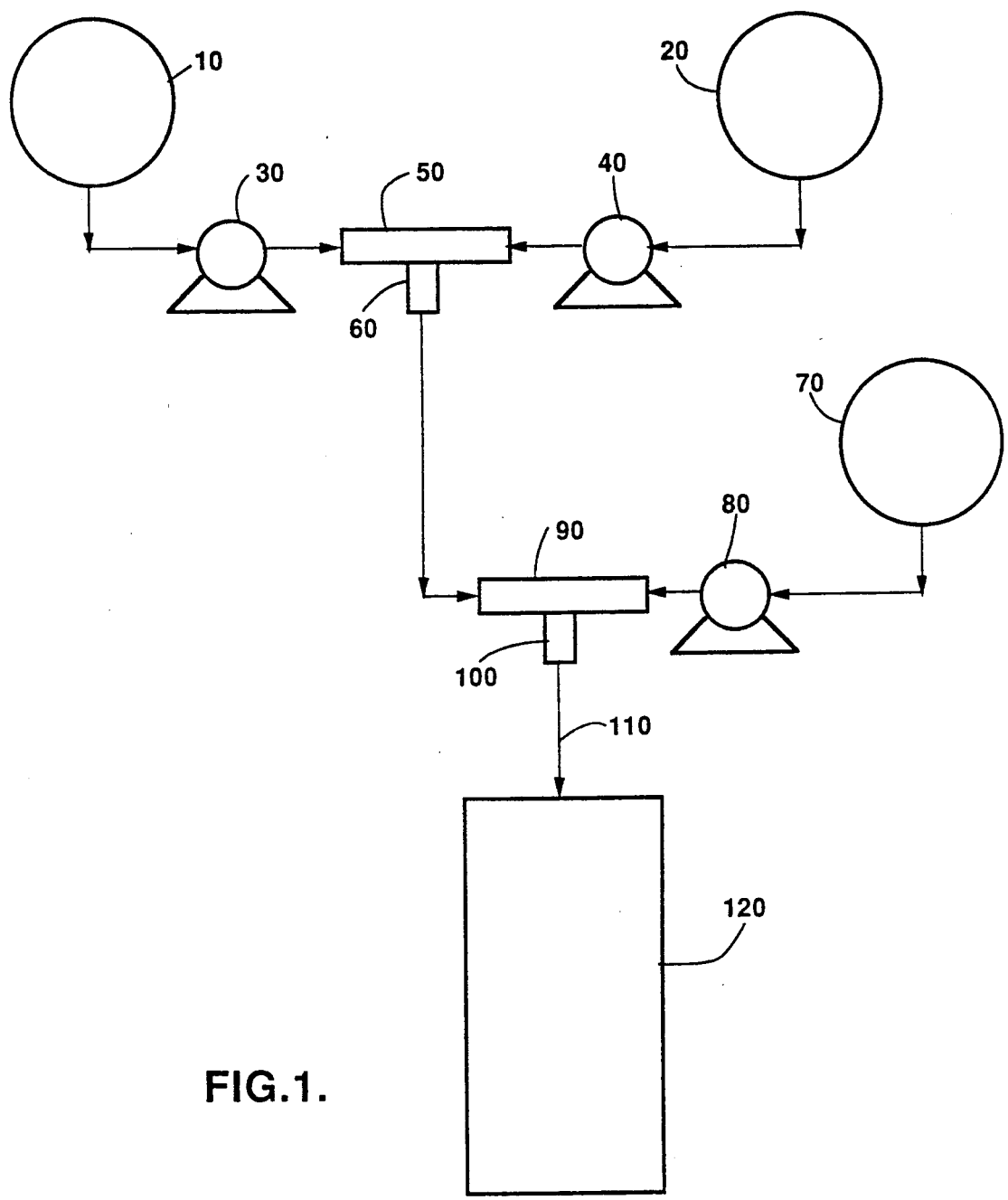
FIG. 1 is a schematic illustration of a mode of practicing the process of the present invention.

The present invention is based on the surprising and unexpected discovery that a polymer-modified polyol dispersion having a combination of relatively high solids content and long term stability may be obtained if a first olamine is used initially in the reaction and, in a controlled manner, a second olamine is added to the reaction mixture thereafter.

The polymer-modified polyol dispersion of the present invention may be obtained by reacting an isocyanate and a first olamine in the presence of a substantially inert polyol to produce a reaction mixture. A second olamine, which may be the same as or different from the first olamine, is added to the reaction mixture prior to completion of the reaction between the isocyanate and the first olamine to produce the polymer-modified polyol dispersion. The so-produced dispersion will usually possess a relatively high solids content and may be used directly or diluted prior to use, depending on the intended application for the dispersion. If the dispersion is to be used directly, care should be exercised to cool the dispersion to a temperature which minimizes or eliminates the occurrence of volatilization of any catalysts or blowing agents (if present) added to the dispersion for use in producing the polyurethane. Typically, this translates into cooling the dispersion to a post-production temperature in the range of from about 10° to about 50° C., preferably in the range of from about 15° to about 45° C., most preferably in the range of from about 20° to about 30° C.

it is a key aspect of the present invention to add the second olamine in a controlled manner after the first olamine and isocyanate have been combined to form a reaction mixture. Generally, the second olamine should be added to the so-formed reaction mixture prior to completion of the reaction between the isocyanate and the first olamine. In practice, suitable results may be obtained by adding the second olamine in the range of from about 1 to about 90 seconds after formation of the reaction mixture. If the second olamine is added less than about 1 second after formation of the reaction mixture, there will not be sufficient time for the initial reaction between the first olamine and isocyanate to occur resulting in an unstable dispersion. If the second olamine is added more than about 90 seconds after formation of the reaction mixture, the initial reaction between the first olamine and the isocyanate will have proceeded too far and the benefits of adding the second olamine will be substantially lost. Preferably, the second olamine is added in the range of from about 1 to about 45 seconds, most preferably in the range of from about 3 to about 15 seconds, after formation of the reaction mixture.

The isocyanate suitable for use in the process is not particularly restricted and the choice thereof is within the purview of a person skilled in the art. See for example British Pat. No. 1,453,258, the contents of which are incorporated herein by reference. Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate. Such an isocyanate is commercially available from Imperial Chemical Industries under the tradename Rubinate M and from The Dow Chemical Company under the tradename PAPI 4027.

The olamine (first or second) suitable for use herein is not particularly restricted and the choice thereof is within the purview of a person skilled in the art. The first olamine and the second olamine may be the same or different. Preferably, the first olamine and the second olamine are different.

Preferably, the olamine (first or second) is selected from the group comprising primary, secondary and tertiary alkanolamines. This group includes nitrogen-containing species having at least one active hydrogen.

Non-limiting examples of suitable alkanolamines include monoethanolamine, diethanolamine, dimethylethanolamine, triethanolamine, N-methylethanolamine, N-ethylethanolamine, N-butylethanolamine, N-methyldiethanolamine, N-ethyldiethanolamine, N-butyldiethanolamine, monoisopropanolamine, diisopropanolamine, triisopropanolamine, N-methylisopropanolamine, N-ethylisopropanolamine, N-propylisopropanolamine and mixtures thereof. The preferred alkanolamine is selected from the group comprising diethanolamine, triethanolamine and mixtures thereof. The most preferred first olamine for use in the present process is triethanolamine and the most preferred second olamine for use in the present process is diethanolamine.

The polyol suitable for use in the process is not particularly restricted provided that it is substantially inert during the reaction between the isocyanate and the first olamine. The choice of polyol is within the purview of a person skilled in the art. See for example British Pat. No. 1,482,213, the contents of which are incorporated herein by reference. Non-limiting examples of suitable polyols include: adipic acid-ethylene glycol polyester, poly(butylene glycol), poly(propylene glycol) and hydroxyl-terminated polybutadiene. The preferred polyol is a polyether polyol, preferably having a molecular weight in the range of from about 200 to about 10,000.

In the initial step of the present process the isocyanate and the first olamine are used in amounts such that the ratio of isocyanate groups (NCO) provided by the isocyanate to the hydroxyl groups (OH) provided by the first olamine is preferably in the range of from about 0.33:1 to about 1:1, more preferably in the range of from about 0.66:1 to about 0.9:1, most preferably in the range of from about 0.66:1 to about 0.8:1. In the second step of the present process, the second olamine is added in an amount preferably in the range of from about 0.5 to about 10, more preferably in the range of from about 1 to about 5, most preferably in the range of from about 2 to about 4, percent by weight based on the weight of the mixture produced in the initial step in the process.

If necessary the reaction between the isocyanate and the first olamine may be conducted in the presence of a catalyst. Catalysts for this purpose are known and the choice thereof is within the purview of a person skilled in the art. Non-limiting examples of suitable catalysts include stannous octoate, dibutyl-tin dilaurate, triethylenediamine and mixtures thereof. The preferred catalyst is dibutyl-tin dilaurate which is used in an amount in the range of up to about 1, more preferably up to about 0.1, most preferably in the range of from about 0.01 to about 0.05, percent by weight of the isocyanate and first olamine reactants in the initial step of the process. As will be appreciated by the those of skill in the art, the need for such a catalyst and type and quantity used thereof is usually dictated by the reactivity of the initial reactants as compared to the inert polyol carrier. The higher the relative reactivity of the inert polyol carrier, the greater the need for a catalyst to preferentially drive the reaction between the isocyanate and the first olamine.

The mode of mixing and the order of addition of the reactants in the present process may be accomplished using conventional techniques known to those of skill in the art. For example, the process may be a batch process wherein the first olamine is dispersed in the polyol and the polyisocyanate is added followed by controlled addition of the second olamine. Alternatively, a similar sequence of addition can be used in an in-line blending technique comprising the use of a polyurethane mix-head for producing a foam product. Such techniques are discussed in more detail in U.S. Pat. No. 4,374,209, incorporated by reference hereinabove.

Polymer-modified polyol dispersions produced in accordance with an aspect of the present process possess a desirable combination of properties. Specifically, the dispersions comprise a polyaddition product in an amount of from about 25 to about 70, more preferably from about 25 to about 50, most preferably from about 30 to about 40, percent by weight based on the total weight of the polyaddition product and the polyol. It should be understood that the term "polyaddition product", as used throughout this specification, is intended to encompass the reaction product of an isocyanate and an olamine.

Further, the dispersions have a viscosity in the range of from about 4,000 to about 50,000 mPa.s, preferably from about 4,000 to about 40,000 mPa.s, the viscosity remaining substantially the same, preferably varying by less than about 10%, more preferably varying by less than about 5%, after production of the polymer-modified polyol. As is known in the art, immediately after production of a polymer-modified polyol dispersion, it is typical for the temperature thereof to equilibrate. In practice, this translates into a period of up to about 2 minutes immediately after production of the dispersion. In the present polymer-modified polyol dispersion, the viscosity thereof remains substantially the same for the period after temperature equilibration. In contrast, in prior art polymer-modified polyol dispersions, the viscosity increases even after post-production temperature equilibration (for example, 10 minutes after production and thereafter).

The present polymer-modified polyol dispersion having a solids content of from about 25% to about 70% by weight may be used as is or diluted with more polyol to a solids content of from about 1% to about 20% by weight. One of the advantages accruing from the present polymer-modified polyol dispersion is that it is sufficiently stable to be produced in one site and shipped to another site for dilution (optional) and subsequent use to produce High Resiliency (HR) foams. Accordingly, a preferred aspect of the process to produce the present polymer-modified polyol dispersion includes the further step of diluting the polymer-modified polyol dispersion to produce a diluted dispersion having a solids content of less than about 15%, more preferably in the range of from about 1% to about 15%, most preferably in the range of from about 5% to about 15%, by weight of the dispersion.

The present polymer-modified polyol dispersions are useful in the production of HR polyurethane foams. HR polyurethane foams are particularly advantageous in the production of padded elements such as cushions for seat systems and the like.

In producing HR polyurethane foam from the present polymer-modified polyol dispersions, conventional additives used in the art may be added to the polymer-modified polyol dispersions. Non-limiting examples of such additives include activators, stabilizers (e.g. polysiloxane-polyalkylene oxide block copolymers), crosslinking or chain lengthening agents (e.g. low molecular weight diols, triols and diamines such as diethanolamine, triethanolamine, ethylene glycol, glycerol, dipropylene glycol and phenylene diamine), blowing agents (e.g. water), flame-proofing agents (e.g. halogenated alkyl phosphates), fillers (e.g. barium sulfate) and pigment pastes. It will be appreciated by those of skill in the art that certain of these additives (e.g. any non-reactive species of flame retardants, pigments, etc.) may be added to the dispersion during production thereof while others (e.g. blowing agents, crosslinking agents, etc.) are added to the dispersion just prior to production of the HR polyurethane foam.

When it is desired to produce the HR polyurethane foam, an isocyanate, a catalyst and a blowing agent for this purpose are added to the dispersion.

The isocyanate may be the same as or different from the isocyanate used to produce the polymer-modified polyol dispersion. Non-limiting examples of suitable such isocyanates have been provided hereinabove. Preferably the isocyanate is selected from the group comprising 2,4-toluene diisocyanate, 2,6-toluene diisocyanate and mixtures thereof. The most preferred isocyanate is a mixture comprising from about 75 to about 85 percent by weight 2,4-toluene diisocyanate and from about 15 to about 25 percent by weight 2,6-toluene diisocyanate.

Suitable catalysts are known, and the choice and concentration thereof is within the purview of a person skilled in the art. See for example U.S. Pat. Nos. 4,296,213 and 4,518,778, the contents of each of which is incorporated herein by reference. Non-limiting examples of suitable catalysts include tertiary amines and organic tin compounds. Of course it will be understood by those skilled in the art that a combination of two or more catalysts may be suitably used.

Suitable blowing agents are known and the choice thereof is within the purview of a person skilled in the art. It is conventional, and preferred, to use water as a blowing agent in producing polyurethane foams. As is known, water reacts with the polyisocyanate forming carbon dioxide which acts as the effective blowing agent in the final foam product. Optionally, organic blowing agents may be used in conjunction with water although the use of such blowing agents is generally being curtailed for environmental considerations. Non-limiting examples of suitable organic blowing agents include HCFC's such as Freon 134a, Freon 142b and the like.

It will be appreciated that the polyol carrier for the dispersion will be a reactant in the production of the HR polyurethane foam. However, it is within the scope of the invention to add a further polyol to the dispersion prior to production of the HR polyurethane foam.

In producing the HR polyurethane foam any of the one shot, prepolymer or quasi-prepolymer conventional in the art may be used. The preferred mode of producing the HR polyurethane foam is one shot.

The manner of mixing the components for producing the HR polyurethane foam is not particularly restricted. Conventional mixing techniques may be employed. Generally, for the production of molded products, it is preferred to utilize a two-stream mixing technique with one stream comprising the polyisocyanate or prepolymer and the other stream comprising remaining components of the reaction mixture.

Embodiments of the present invention will now be described with reference to the following Examples which are provided for illustrative purposes only and should not be used to limit the scope of the invention. In the Examples, reactants were used on the basis of parts by weight, unless otherwise stated.

FIG. 1 illustrates a schematic of an embodiment of the process of invention used in various Examples. This particular embodiment relates to in-line blending of the reactants. As shown, a polyol blend tank 10 is provided and contains a blend of the polyol, the first olamine and, optionally, the catalyst. An isocyanate tank 20 is also provided and contains the isocyanate. A pump 30 is provided for delivering a portion of the polyol blend from tank 10 to a first mix head 50. Similarly, a pump 40 is provided for delivering a portion of isocyanate from tank 20 to first mix head 50. As is known in the art, the provision of a mix head allows for control of volumetric (and thus stoichiometric) control of a multi-line input of reactants. First mix head 50 is in communication with a primary mixer 60 which serves to mix (optionally with agitation) the polyol blend and isocyanate to provide a homogeneous reaction mixture.

The reaction mixture exits primary mixer 60 and is fed to a second mix head 90. Second mix head 90 also receives input of the second olamine via a pump 80 connected (directly or indirectly) to an olamine tank 70. Second mix head 90 is in communication with a secondary mixer 100 which serves to mix (optionally with agitation) the reaction mixture exiting primary mixer 60 and the second olamine. The output of secondary mixer 100 is fed, via a reaction tube 110, to a collection tank 120 which receives the PIPA dispersion product.

In the Examples, reference will be made to various polyether polyols and isocyanates. The characteristics of these polyether polyols and isocyanates may be found in Tables 1 and 2, respectively.

EXAMPLE 1

In this Example the polyol blend in tank 10 comprised a blend of Polyether Polyol A, 99% pure triethanolamine (TEOA, the first olamine) and dibutyltin dilaurate. The polyol blend was then heated under constant agitation to 55° C. and mix head 50 was calibrated to provide the stoichiometric amounts of the polyol blend and isocyanate indicated in Table 3. Five (5) seconds after leaving primary mixer 60, the reaction mixture was fed to second mix head 90 where it was homogeneously mixed with 99% pure diethanolamine low freeze grade (DEOA-LF, the second olamine). A fast exothermic reaction took place resulting in an increase in the temperature of the blend to 105° C. and a stable dispersion was produced having the properties shown in Table 3.

EXAMPLE 2 (COMPARATIVE)

This Example will illustrate the criticality of adding the second olamine. Specifically, in this Example, the procedure of Example 1 was repeated except the second olamine was not used. The amount of each reactant used may be found in Table 3.

Upon mixing the polyol blend (comprising the first olamine) and the isocyanate, a fast reaction took place and the product mixture exiting primary mixer 60 gelled within one minute. Accordingly, the viscosity of this product was unmeasureable (see Table 3).

TABLE 3

| COMPONENTS | Example 1 | Example 2 |
|---|---|---|
| Polyol Blend: | | |
| Polyether Polyol A | 100.0 | 100.0 |
| TEOA | 13.1 | 14.7 |
| Dibutyl-tin Dilaurate | 0.028 | 0.028 |
| Isocyanate: | | |
| Isocyanate A | 25.3 | 28.4 |
| Second Olamine: | | |
| DEOA-LF | 4.3 | 0 |
| Product: | | |
| % Solids | 30.0 | — |
| Viscosity (mPa · s @ 25° C.) | 7200 | GEL |

EXAMPLES 3-12

In these Examples, the effects of varying amount of second olamine added are illustrated. The same apparatus and methodology described in Example 1 were used in these Examples. Table 4 provides the composition of the polyol blend, the amounts of isocyanate and second olamine used together with the solids content and viscosity of the product dispersion.

Figure 2:
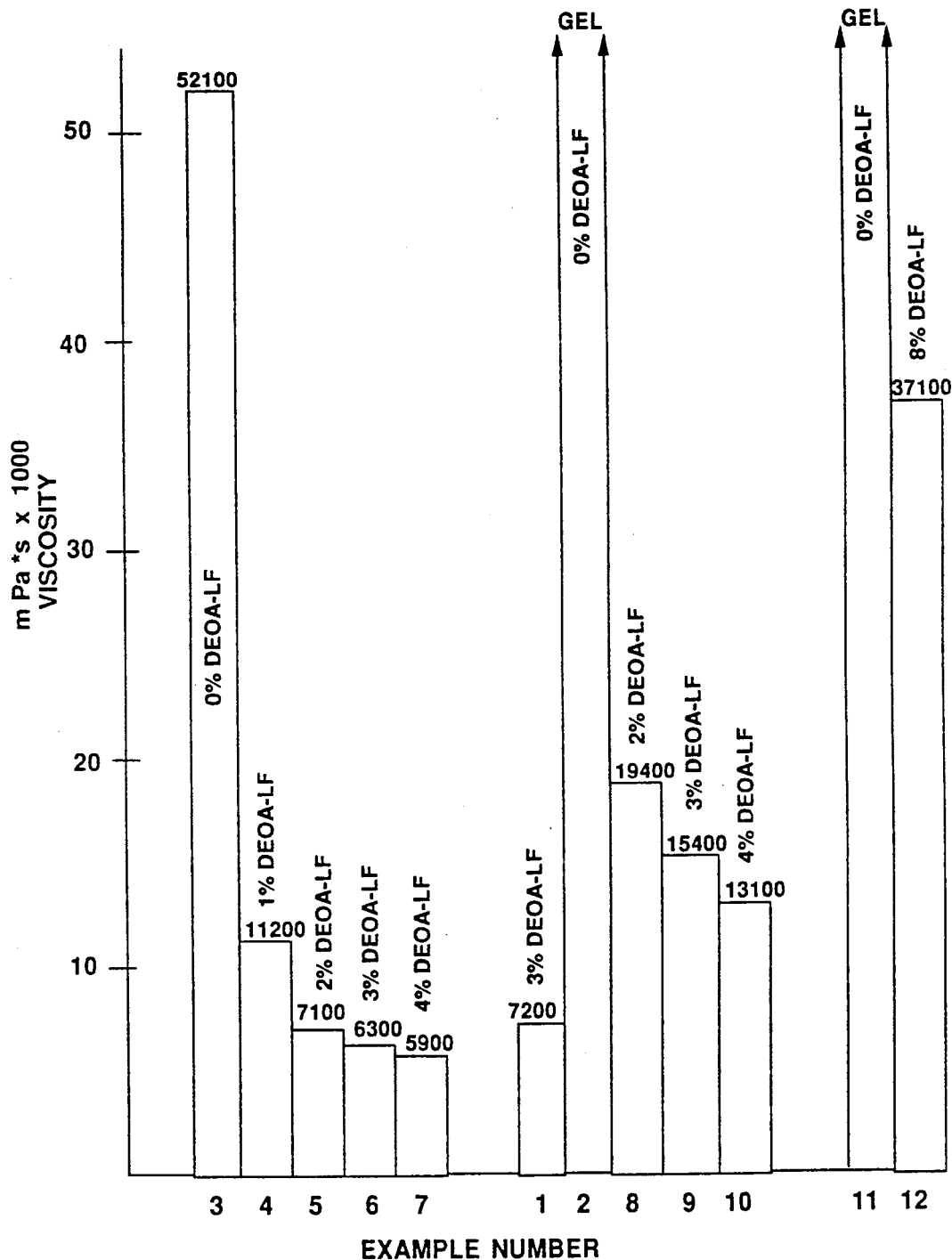
FIG. 2 is a graphical illustration of the effect of viscosity versus solids content of a polymer-modified polyol dispersion.

As will be apparent, a second olamine was not used in Examples 3 and 11 which are provided for comparison purposes only and are outside the scope of the present invention. The results from Example 2 have also been provided in Table 4 for comparative purposes. The results provided in Table 4 are presented graphically in FIG. 2.

The relative effects of second olamine addition are clearly observed and the production of low viscosity

TABLE 1

| POLYOL | HYDROXYL NUMBER (mg KOH/g sample) | FUNCTIONALITY (f) | % ETHYLENE OXIDE (TIPPED) | % PRIMARY HYDROXYL |
|---|---|---|---|---|
| Polyether Polyol A | 34 | 2.4 | 17.5 | 82 |
| Polyether Polyol B | 34 | 2.8 | 19.0 | 82 |
| Polyether Polyol D | 34 | 2.5 | 14.0 | 77 |
| Polyether Polyol E | 28 | 3.4 | 16.0 | 80 |
| Polyether Polyol F | 28 | 2.2 | 17.0 | 80 | material is demonstrated.

EXAMPLES 13-14

These Examples provide a timed study on the stability of a prior art PTPA dispersion (Example 13) and a PIPA dispersion within the scope of the present invention (Example 14). A direct indication of stability is usually provided by measuring the change over time of the viscosity of the dispersion.

Table 5 provides an indication of the composition of the polyol blend, the amounts of polyol blend (the first olamine used was TEOA), isocyanate and second ola-

TABLE 2

| ISO-CYANATE | TYPE | f | FREE NCO | APPEARANCE |
|---|---|---|---|---|
| Isocyanate A (Rubinate M) | Polymeric diphenylmethane diisocyanate | 2.7 | 31.5 | Dark brown |
| Isocyanate B (Lupranate T-80) | 80/20 Blend of 2,4-/2,6-tolulene diisocyanate | 2.0 | 48.3 | Clear colorless | mine (DEOA) (if used), together with the solids content of the resulting product.

Figure 3:
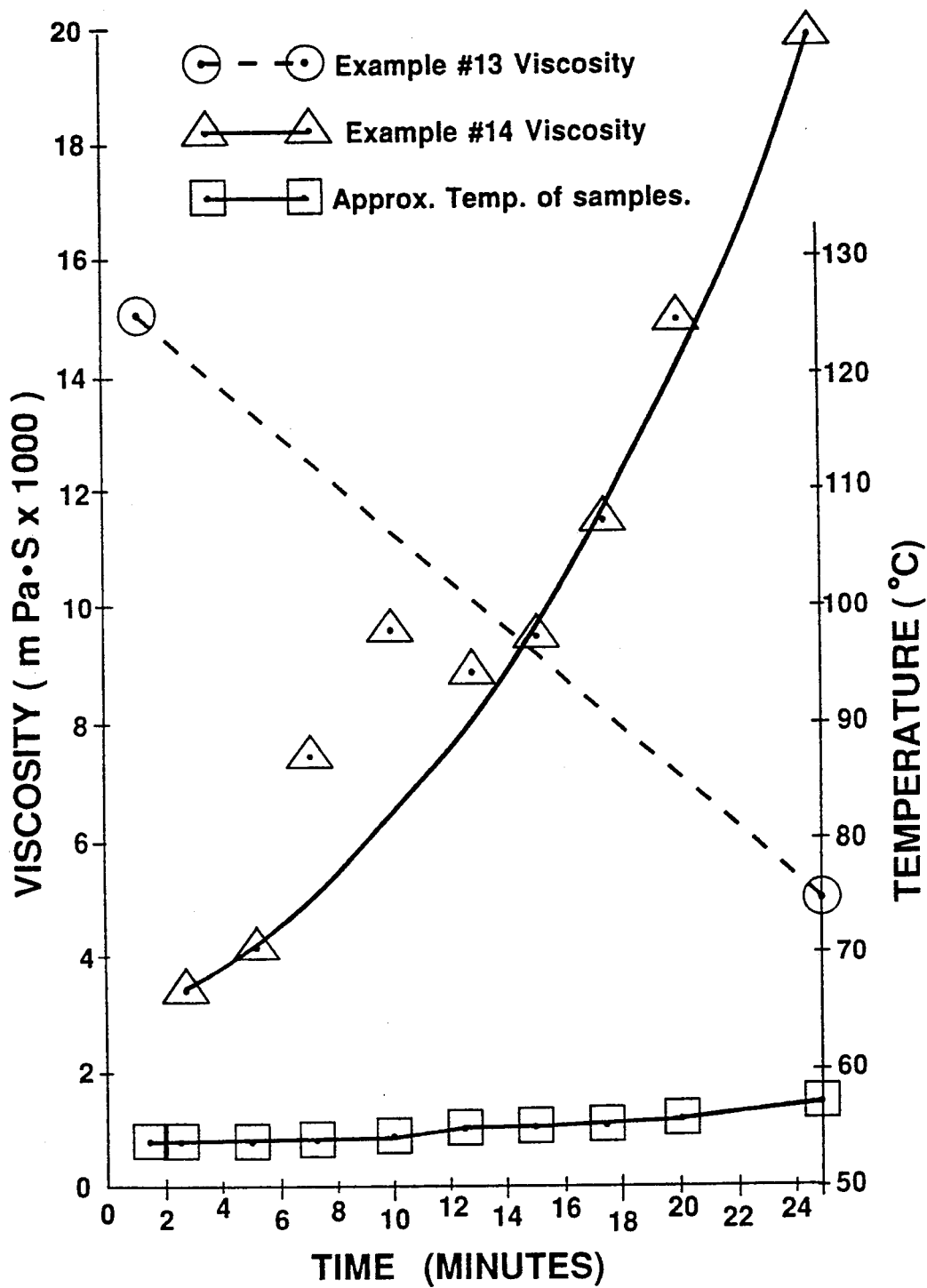
FIG. 3 is a graphical illustration of the stability of various polymer-modified polyol dispersions as a function of viscosity.

As is apparent from Table 5, the second olamine was not used in Example 13 and thus, this Example is provided for comparative purposes only and is outside the scope of the present invention. After the polyol blend and isocyanate were contacted and mixed, a white suspension, dilatent in nature, was formed at ~13 seconds and the viscosity was monitored over time, as shown in FIG. 3. The viscosity increased over a period of minutes, as is clear from these observations, indicating that the product is not stable in this form.

In Example 14, the addition of the second olamine at ~13 seconds immediately resulted in the formation of a smooth white suspension which had a significant decrease in viscosity (i.e. compared to dispersion produced in Example 13). As shown in FIG. 3, the viscosity of the dispersion formed in Example 14 was

TABLE 4

| Components | Example # | | | | | | | | | | |
|---|---|---|---|---|---|---|---|---|---|---|---|
| | 3 | 4 | 5 | 6 | 7 | 2 | 8 | 9 | 10 | 11 | 12 |
| Polyether Polyol A | 100 | 100 | 100 | 100 | 100 | 100 | 100 | 100 | 100 | 100 | 100 |
| TEOA | 11.5 | 11.5 | 11.5 | 11.5 | 11.5 | 14.7 | 14.7 | 14.7 | 14.7 | 22.8 | 22.8 |
| Dibutyl-tin Dilaurate ($\times 10^{-2}$) | 2.7 | 2.7 | 2.7 | 2.7 | 2.7 | 2.8 | 2.8 | 2.8 | 2.8 | 3.3 | 3.3 |
| Isocyanate A | 22.1 | 22.1 | 22.1 | 22.1 | 22.1 | 28.4 | 28.4 | 28.4 | 28.4 | 44.2 | 44.2 |
| DEOA-LF | 0 | 1.3 | 2.7 | 4.0 | 5.3 | 0 | 2.8 | 4.3 | 5.7 | 0 | 13.3 |
| % DEOA-LF | 0 | 1 | 2 | 3 | 4 | 0 | 2 | 3 | 4 | 0 | 8 |
| % Solids | 25.1 | 25.7 | 26.4 | 27.1 | 27.8 | — | 31.6 | 32.2 | 32.9 | — | 44.1 |
| Viscosity, $\times 10^{-3}$ (mPa · s @ 25° C.) | 52.1 | 11.2 | 7.1 | 6.3 | 5.9 | GEL | 19.4 | 15.4 | 13.1 | GEL | 37.1 | such that it was relatively unchanged from 30 seconds onward evidencing the stability of the dispersion.

TABLE 5

| Components | Example 13 | Example 14 |
|---|---|---|
| Polyether Polyol F | 100.0 | 100.0 |
| TEOA | 46.0 | 46.0 |
| Isocyanate B | 54.1 | 54.1 |
| DEOA | 0 | 10.0 |
| % DEOA | 0 | 5 |
| % Solids | 51.2 | 54.5 |
| Viscosity (mPa · s @ 25° C.), $\times 10^{-3}$ | 120.5 | 22.0 |

EXAMPLES 15–18

These Examples illustrate the ability to use the present process to produce a relatively low solids content dispersion. Further, the ability to use various second olamines is exemplified.

In these Examples, the apparatus and methodology described in the batch process of Example 13 was repeated with the exception that the second olamine was added after 5 seconds.

The composition of the polyol blend, the amounts of polyol blend and second olamine, together with the viscosity of the dispersion produced are provided in Table 6. In each case, the dispersion had a solids content of 20%.

The results in Table 6 clearly indicate that the present process may be used to produce a low solids content dispersion and that various second olamines may be used.

TABLE 6

| Component | Example | | | |
|---|---|---|---|---|
| | 15 | 16 | 17 | 18 |
| Polyol Blend: | | | | |

TABLE 6-continued

| Component | Example | | | |
|---|---|---|---|---|
| | 15 | 16 | 17 | 18 |
| Polyether Polyol A | 100.0 | 100.0 | 100.0 | 100.0 |
| TEOA | 8.25 | 8.25 | 8.25 | 8.25 |
| Dibutyl-tin Dilaurate | 0.025 | 0.025 | 0.025 | 0.025 |
| Isocyanate A | 16.0 | 16.0 | 16.0 | 16.8 |
| Second Olamine: | | | | |
| DEOA | 0 | 0.85 | 0 | 0 |
| Glycerol | 0 | 0 | 0.5 | 0 |
| MDEOA* | 0 | 0 | 0 | 0.5 |
| Product: | | | | |
| Viscosity (mPa · s @ 25° C.) | 7500 | 5000 | 5030 | 4700 |

*methyldiethanolamine

EXAMPLES 19–21

These Examples illustrate the use of various polyols in practicing the invention. The apparatus and methodology employed in Example 1 were used, in these Examples. Table 7 provides the composition of the polyol blend, the amounts of polyol blend, isocyanate and second olamine (in these Examples: DEOA-LF) used together with the solids content and viscosity of the product dispersion. The polyol blend used in these Examples comprised: a polyol, TEOA as the first olamine and a catalyst.

The differences in the viscosity of the product dispersion is directly related to the percent primary hydroxyl in the polyol used in the polyol blend. This observation supports the conclusion that, in the present invention, the polyol still has a small role in the reaction which results in enhanced particle stability in the dispersion.

TABLE 7

| Component | Example | | |
|---|---|---|---|
| | 19 | 20 | 21 |
| Polyol Blend: | | | |
| Polyether Polyol A | 100.0 | 0 | 0 |
| Polyether Polyol D | 0 | 100.0 | 0 |
| Polyether Polyol B | 0 | 0 | 100.0 |
| TEOA | 13.1 | 15.4 | 15.4 |
| Dibutyl-tin Dilaurate | .029 | .029 | .029 |
| Isocyanate A | 25.4 | 25.4 | 25.4 |
| Second Olamine: | | | |
| DEOA-LF | 4.25 | 4.25 | 4.25 |
| Product: | | | |
| % Solids | 30.0 | 30.0 | 30.0 |
| Viscosity (mPa · s @ 25° C.) | 7200 | 6300 | 8200 |

EXAMPLES 22–23

These Examples demonstrate the criticality of second olamine addition in the process of the invention. The apparatus and methodology described in Example 15 was repeated.

The composition of the polyol blend, the amount of polyol blend and isocyanate, together with the properties of the dispersion product are provided in Table 8.

As is evident from the results in Table 8, the present process may be used to provide a relatively low solids content dispersion having a manageable viscosity compared to the case where the second olamine is not added pursuant to the present process.

TABLE 8

| Component | Example 22 | Example 23 |
|---|---|---|
| Polyether Polyol E | 100.0 | 100.0 |
| TEOA | 8.25 | 8.25 |
| Dibutyl-tin Dilaurate | 0.025 | 0.025 |
| Isocyanate A | 16.0 | 16.0 |
| DEOA-LF | 0 | 2.0 |
| % Solids | 19.0 | 20.5 |
| Viscosity (mPa·s @ 25° C.) | 76000 | 9100 |

EXAMPLES 24-25

In these Examples, PIPA dispersions were used to produce HR polyurethane foams.

In Example 24, the dispersion made in Example 1 was used. In Example 25, use was made of a conventional PIPA dispersion commercially available from Woodbridge Foam Corporation under the tradename RB 221.

Table 9 provides a composition of the PIPA blend and isocyanate used to produce the HR polyurethane foam. The PIPA blend and the isocyanate were mixed at an isocyanate index of 100 using a conventional two-stream mixing technique.

The physical properties of the foams produced were determined and are reported in Table 10. As will be seen, the PIPA dispersion of the invention (Example 24) provides a foam having similar properties to that produced using a conventional PTPA dispersion. The advantage in using the PIPA dispersion of the present invention is that when it is diluted to a solids content commersurate with that of conventional PIPA dispersions, a lower viscosity is achieved. Specifically, the RB 221 PIPA dispersion used in Example 25 has a solids content of 20%. In Example 25, this dispersion was diluted to a solids content of 12% relative to the polyol A diluant (only).

The polyol dispersion used in Example 24 (i.e. that obtained from Example 1 above) had a solids content of 30% and was also diluted to a solids content of 12% based on the polyol A diluant (only). The key distinction is the diluted PIPA dispersion in Example 24 had a viscosity significantly less than that of the diluted conventional PIPA dispersion in Example 25 (2650 mPa.s versus 3500 mPa.s respectively).

TABLE 9

|  | Example 24 | Example 25 |
|---|---|---|
| PIPA Blend: |  |  |
| Polyether Polyol A | 60.00 | 40.00 |
| PIPA Polyol | 40.00 | 60.00 |
| H$_2$O | 4.00 | 4.00 |
| DEOA-LF | 0.60 | 1.70 |
| DABCO 33LV | 1.50 | 1.50 |
| NIAX A1 | 0.08 | 0.08 |
| DC 5043 | 1.00 | 1.00 |
| Isocyanate: |  |  |
| Isocyanate B | 52.2 | 52.0 |

TABLE 9-continued

|  | Example 24 | Example 25 |
|---|---|---|
| Isocyanate Index | 100 | 100 |

DEOA-LF (stabilizer): A blend of 85% by weight of pure DEOA and 15% by weight of H$_2$O available from Union Carbide Corporation DABCO 33LV (catalyst): A 33% by weight solution of triethylene diamine in 67% by weight of dipropylene glycol available from Air Products and Chemicals Inc.

Niax A1 (catalyst): A 70% by weight blend of bis (dimethylaminoethyl) ether in 30% dipropylene glycol available from Union Carbide Corporation Dabco DC5043: A polysiloxane-polyalkylene oxide block surfactant available from Air Products and Chemicals Inc.

TABLE 10

| Physical Properties | Example 24 | Example 25 |
|---|---|---|
| Core Density, kg/m$^3$ | 29 | 30 |
| Tensile Strength, kPa | 155 | 160 |
| Elongation, % | 150 | 150 |
| Tear Strength, N/m | 245 | 255 |
| Compression Set, % | 11 | 14 |
| Compression Set After Humid Ageing (6 hours at 105° C.) | 23 | 24 |

What is claimed is:

1. A polymer-modified polyol dispersion comprising a polyaddition product dispersed in a polyol, the polyaddition product being present in an amount of from about 25 to about 70 percent by weight based on the total weight of the polyaddition product and the polyol, the dispersion having a viscosity in the range of from about 4,000 to about 50,000 mPa.s, the viscosity remaining substantially the same after production of the polymer-modified polyol dispersion.

2. The polymer-modified polyol dispersion defined in claim 1, wherein the viscosity varies by less than about 10% after production of the polymer-modified polyol dispersion.

3. The polymer-modified polyol dispersion defined in claim 1, wherein the viscosity varies by less than about 5% after production of the polymer-modified polyol dispersion.

4. The polymer modified polyol dispersion defined in claim 3, wherein the polyaddition product is present in an amount of from about 30 to about 40 percent by weight based on the total weight of the polyaddition product and the dispersion has a viscosity in the range of from about 7000 to about 40,000 mPa.s.

5. The polymer-modified polyol dispersion defined in claim 1, wherein the polyaddition product is the reaction product of an isocyanate and an olaminc.

6. The polymer-modified polyol dispersion defined in claim 5, wherein the isocyanate is selected from the group consisting essentially of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

7. The polymer-modified polyol dispersion defined in claim 5, wherein the isocyanate is selected from the group consisting essentially of 2,4-toluene diisocyanate, 2,6-toluene diisocyanate and mixtures thereof.

8. The polymer-modified polyol dispersion defined in claim 5, wherein the isocyanate is a mixture comprising from 75 to about 85 percent by weight 2,4-toluene diisocyanate and from about 15 to about 25 percent by weight 2,6-toluene diisocyanate.

9. The polymer-modified polyol dispersion defined in claim 5, wherein the isocyanate is selected from the group consisting essentially of 2,4'-diphenylmethane diisocyanate, 4,4'-diphenylmethane diisocyanate and mixtures thereof.

10. The polymer-modified polyol dispersion defined in claim 5, wherein the isocyanate is a mixture comprising from about 15 to about 25 percent by weight 2,4'-diphenylmethane diisocyanate and from about 75 to about 85 percent by weight 4,4'-diphenylmethane diisocyanate.

11. The polymer-modified polyol dispersion defined in claim 5, wherein the olamine is selected from the group consisting essentially of primary, secondary and tertiary alkanolamines.

12. The polymer-modified polyol dispersion defined in claim 6, wherein the alkanolamine is selected from the group consisting essentially of monoethanolamine, diethanolamine, dimethylethanolamine, triethanolamine, N-methylethanolamine, N-ethylethanolamine, N-butylethanolamine, N-methyldiethanolamine, N-ethyldiethanolamine, N-butyldiethanolamine, monoisopropanolamine, diisopropanolamine, triisopropanolamine, N-methylisopropanolamine, N-ethylisopropanolamine, N-propylisopropanolamine and mixtures thereof.

13. The polymer-modified polyol dispersion defined in claim 8, wherein the alkanolamine is selected from the group consisting essentially of diethanolamine and triethanolamine.

14. The polymer-modified polyol dispersion defined in claim 10, wherein the alkanolamine is selected from the group consisting essentially of diethanolamine and triethanolamine.

15. The polymer-modified polyol dispersion defined in claim 5, wherein the polyol is a polyether polyol.

16. The polymer-modified polyol dispersion defined in claim 15, wherein the polyether polyol has a molecular weight in the range of from about 200 to about 10,000.

17. The polymer-modified polyol dispersion defined in claim 15, wherein the polyether polyol has a molecular weight in the range of from about 2,000 to about 7,000.

18. The polymer-modified polyol dispersion defined in claim 15, wherein the polyether polyol has a molecular weight in the range of from about 2,000 to about 6,000.

19. The polymer-modified polyol dispersion defined in claim 5, wherein the polyol is selected from the group comprising adipic acid-ethylene glycol polyester, poly(butylene glycol), poly(propylene glycol) and hydroxyl-terminated polybutadiene.

20. A process for producing a polymer-modified polyol dispersion comprising the steps of:
(i) reacting an isocyanate and a first olamine in the presence of a substantially inert polyol to produce a reaction mixture; and
(ii) adding a second olamine which may be the same as or different from the first olamine to the reaction mixture prior to completion of the reaction between the isocyanate and the first olamine to produce the polymer-modified polyol dispersion.

21. The process defined in claim 20, wherein Step (ii) is conducted during the period of from about 1 to about 90 seconds after production of the reaction mixture in Step (1).

22. The process defined in claim 20, wherein Step (ii) is conducted during the period of from about 1 to about 45 seconds after production of the reaction mixture in Step (1).

23. The process defined in claim 20, wherein Step (ii) is conducted during the period of from about 3 to about 15 seconds after production of the reaction mixture in Step (1).

24. The process defined in claim 20, wherein the isocyanate is selected from the group consisting essentially of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

25. The process defined in claim 22, wherein the isocyanate is selected from the group consisting essentially of 2,4-toluene diisocyanate, 2,6-toluene diisocyanate and mixtures thereof.

26. The process defined in claim 23, wherein the isocyanate is a mixture comprising from about 75 to about 85 percent by weight 2,4-toluene diisocyanate and from about 15 to about 25 percent by weight 2,6-toluene diisocyanate.

27. The process defined in claim 22, wherein the isocyanate is selected from the group consisting essentially of 2,4'-diphenylmethane diisocyanate, 4,4'-diphenylmethane diisocyanate and mixtues thereof.

28. The process defined in claim 23, wherein the isocyanate is a mixture comprising from about 15 to about 25 percent by weight 2,4'-diphenylmethane diisocyanate and from about 75 to about 85 percent by weight 4,4'-diphenylmethane diisocyanate.

29. The process defined in claim 20, wherein the olamine is selected from the group consisting essentially of primary, secondary and tertiary alkanolamines, and mixtures thereof.

30. The process defined in claim 22, wherein the alkanolamine is selected from the group consisting essentially of monoethanolamine, diethanolamine, dimethylethanolamine, triethanolamine, N-methylethanolamine, N-ethylethanolamine, N-butylethanolamine, N-methyldiethanolamine, N-ethyldiethanolamine, N-butyldiethanolamine, monoisopropanolamine, diisopropanolamine, triisopropanolamine, N-methylisopropanolamine, N-ethylisopropanolamine, N-propylisopropanolamine and mixtures thereof.

31. The process defined in claim 23, wherein the alkanolamine is selected from the group consisting essentially of diethanolamine, triethanolamine and mixtures thereof.

32. The process defined in claim 20, wherein the polyol is a polyether polyol.

33. The process defined in claim 32, wherein the polyether polyol has a molecular weight in the range of from about 200 to about 10,000.

34. The process defined in claim 32, wherein the polyether polyol has a molecular weight in the range of from about 2,000 to about 7,000.

35. The process defined in claim 32, wherein the polyether polyol has a molecular weight in the range of from about 2,000 to about 6,000.

36. The process defined in claim 20, wherein the polyol is selected from the group comprising adipic acid ethylene glycol polyester, poly(butylene glycol), poly(propylene glycol) and hydroxyl-terminated polybutadiene.

37. The process defined in claim 20, wherein Step (i) is conducted in the presence of a catalyst.

38. The process defined in claim 37, wherein the catalyst is selected from the group consisting essentially of stannous octoate, dibutyl-tin dilaurate, triethylenediamine and mixtures thereof.

39. A process for producing a polyurethane comprising the step of reacting a polymer-modified polyol dispersion, a catalyst and an isocyanate;
wherein the polymer-modified polyol dispersion comprises a polyaddition product dispersed in a polyol, the polyaddition product being present in an amount of from about 25 to about 70 percent by weight based on the total weight of the polyaddition product and the polyol, the dispersion having a viscosity in the range of from about 4,000 to about 50,000 mPa.s, the viscosity remaining substantially the same after production of the polymer-modified polyol dispersion.

* * * * *

UNITED STATES PATENT AND TRADEMARK OFFICE
CERTIFICATE OF CORRECTION

PATENT NO. : 5,292,778
DATED : March 8, 1994
INVENTOR(S) : VAN VEEN, ET AL.

It is certified that error appears in the above-indentified patent and that said Letters Patent is hereby corrected as shown below:

[57] ABSTRACT
   Line 7, "mPa.s," should read --mPa·s,--.

COLUMN 2
   Line 62, "mPa.s," should read --mPa·s,--.

COLUMN 3
   Line 19, "mPa.s," should read --mPa·s,--; and
   Line 68, "site" should read --sites--.

COLUMN 4
   Line 67, "it" should read --It--.

COLUMN 7
   Line 17, "mPa.s," should read --mPa·s,--; and
   Line 18, "mPa.s," should read --mPa·s,--.

COLUMN 8
   Line 6, "IIR" should read --HR--.

COLUMN 10
   Line 29, "varying" should read --varying the--.

COLUMN 13
   Line 40, "PTPA dispersion." should read --PIPA dispersion.--;
   Line 55, "mPa.s" should read --mPa·s--; and
   Line 56, "mPa.s" should read --mPa·s--.

UNITED STATES PATENT AND TRADEMARK OFFICE
CERTIFICATE OF CORRECTION

PATENT NO. : 5,292,778
DATED : March 8, 1994
INVENTOR(S) : VAN VEEN, ET AL.

It is certified that error appears in the above-indentified patent and that said Letters Patent is hereby corrected as shown below:

COLUMN 14
    Line 37, "mPa.s," should read --mPa·s,--;
    Line 53, "mPa.s." should read --mPa·s.--; and
    Line 56, "olaminc." should read --olamine--.

COLUMN 16
    Line 52, "mixtues" should read --mixtures--.

COLUMN 17
    Line 21, "acid" should read --acid- --.

COLUMN 18
    Line 19, "mPa.s," should read --mPa·s,--.

Signed and Sealed this

Sixteenth Day of August, 1994

Attest:

BRUCE LEHMAN

Attesting Officer     Commissioner of Patents and Trademarks